United States Patent [19]
Marks

[11] 4,134,349
[45] Jan. 16, 1979

[54] FERTILIZER AND INSECTICIDE APPLICATOR
[76] Inventor: Eugene J. Marks, 5248 Los Adornos Way, Los Angeles, Calif. 90027
[21] Appl. No.: 831,159
[22] Filed: Sep. 7, 1977
[51] Int. Cl.$^2$ ............................................. A01C 5/02
[52] U.S. Cl. ................................... 111/95; 222/441; 222/450; 222/452; 222/323; 222/324
[58] Field of Search ...................... 111/50, 95, 96, 92, 111/98; 47/48.5; 222/439, 441, 444, 448, 458, 452, 323, 324

[56] References Cited
U.S. PATENT DOCUMENTS

| | | | |
|---|---|---|---|
| 32,725 | 7/1861 | Shores | 111/95 |
| 557,483 | 3/1896 | Bryson | 111/92 |
| 1,283,180 | 10/1918 | Hennig | 111/92 |
| 1,844,260 | 2/1932 | Nicolino | 111/95 X |
| 1,879,109 | 9/1932 | Coy | 222/452 X |
| 2,059,135 | 10/1936 | Moe | 222/452 X |
| 2,390,686 | 12/1945 | Bishop | 111/95 |
| 2,611,514 | 9/1952 | Peyton | 111/95 X |
| 2,613,018 | 10/1952 | Truitt | 222/452 |
| 2,734,468 | 2/1956 | Jones | 111/95 |
| 2,767,820 | 10/1956 | Ramsey | 111/92 X |
| 4,011,612 | 3/1977 | Atkinson | 111/92 X |

FOREIGN PATENT DOCUMENTS

| | | | |
|---|---|---|---|
| 93345 | 8/1897 | Fed. Rep. of Germany | 111/95 |
| 128511 | 6/1919 | United Kingdom | 222/452 |
| 851450 | 10/1960 | United Kingdom | 47/48.5 |

Primary Examiner—E. H. Eickholt
Attorney, Agent, or Firm—William P. Green

[57] ABSTRACT

A portable applicator for applying a dry fertilizer and/or insecticide material onto the surface of the earth adjacent a plant, and including an elongated essentially tubular body structure carrying at its upper end a container of the dry material and containing a passage through which the material flows downwardly to a bottom outlet under the control of a rotary valve element which is preferably actuated by a handle part serving the dual purposes of assisting in holding and manipulating the overall tool and also actuating the valve element when the handle grip is turned about its axis. The lower end of the body has fingers capable of cultivating the earth's surface for working the deposited dry material a short distance into that surface.

21 Claims, 7 Drawing Figures

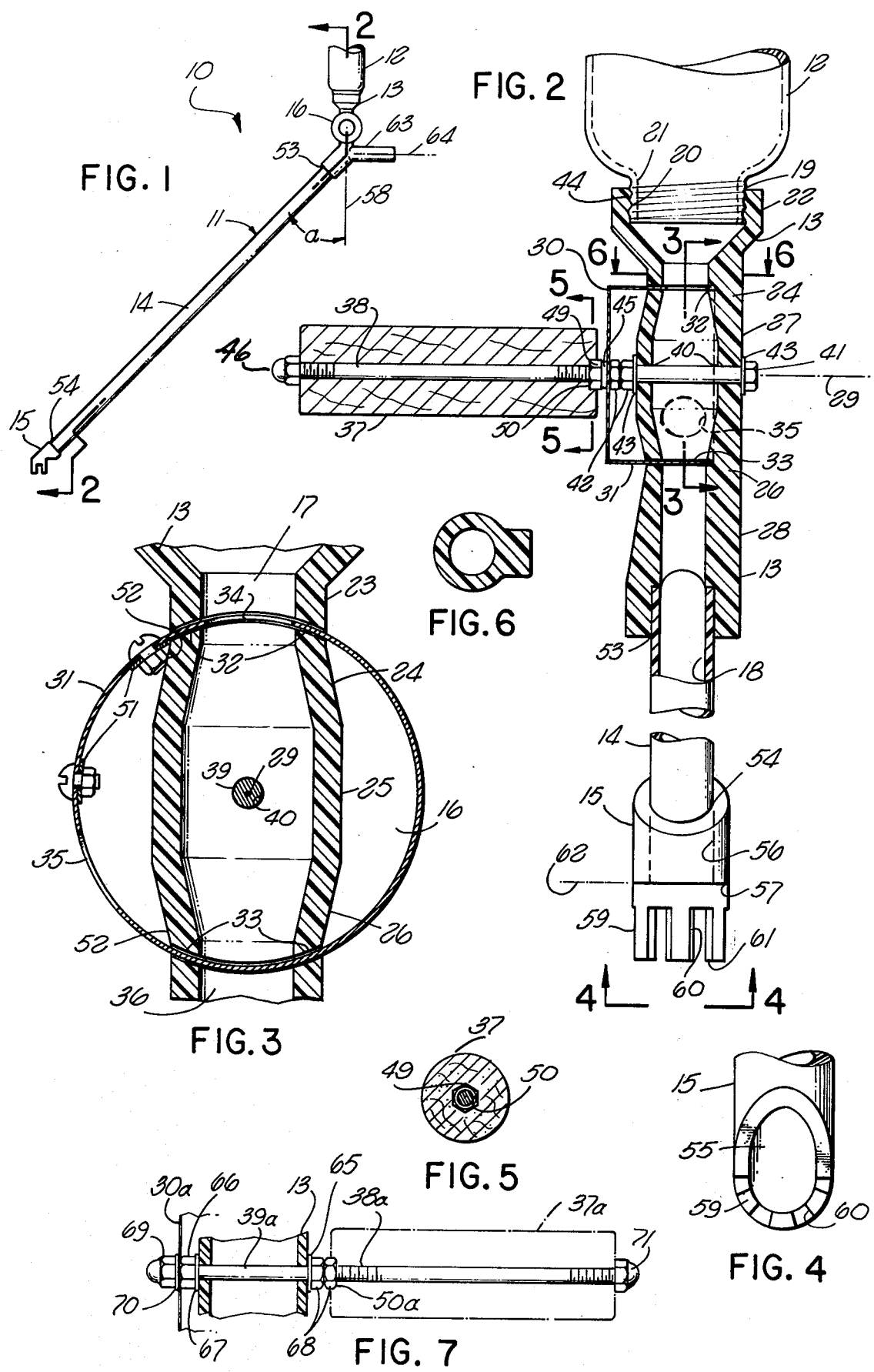

FERTILIZER AND INSECTICIDE APPLICATOR

BACKGROUND OF THE INVENTION

This invention relates to improved applicators for applying a dry fertilizer or insecticide material to the earth adjacent a plant.

The usual process of fertilizing plants such as rose bushes, camellia bushes, azalea bushes, and the like involves measuring out an appropriate amount of the fertilizer in a cup or other container, pouring the material from the container onto the earth's surface at locations about the base of the plant, and then raking the surface slightly or otherwise working the material into the upper layer of earth. If the plant has substantial foliage near the ground level, it may be difficult to reach past that foliage to properly position and work in the fertilizer, and it is a sufficiently dirty job to discourage many persons from giving the proper regular treatment to their plants. Also, use of a standard rake for distributing the fertilizer may damage the very sensitive surface roots of a plant such as a rose, camellia, azalea or the like.

There have been proposed various devices for attempting to facilitate the application of fertilizer to planted areas, such as for example the tool shown in U.S. Pat. No. 1,911,692, in which a tubular body has a hopper at its upper end for holding a supply of the fertilizing material and has a lower pointed end adapted to be forced into the surface of the earth to make an opening into which some of the fertilizer may then be discharged through an opening formed in the side of the tubular body above the pointed end. U.S. Pat. No. 2,857,864 shows a device in which rotation of a crank type handle at the upper end of a body turns a screw at the lower end of the body to force dry material from a hopper near the screw into the earth. U.S. Pat. No. 3,132,067 shows a device having a bottom flapper valve for discharging pellets from a tube.

SUMMARY OF THE INVENTION

The present invention provides a unique fertilizer and/or insecticide applicator which can be manipulated by a person in standing position at a side of a bush, and which is constructed to reach through the foliage of the bush to a location at its base, and deposit metered amounts of a dry fertilizer or insecticide onto the surface of the earth adjacent the plant. The lower end of the tool can be moved to apply the dry material along an extended area as the tool is moved by the user, and also is capable of working the earth slightly but not excessively to mix the material into the upper layer of earth without damaging the surface roots.

Structurally, the device includes an essentially tubular elongated portable body structure having a handle or handles near its upper end by which a user holds and manipulates the tool, and with the upper portion of the body being adapted to carry a supply of the dry material to be deposited. The material flows downwardly through the interior of the tubular body to a bottom outlet, from which it discharges onto the earth's surface, under the control of a valve element carried by the body structure and adapted to be manually actuated. The valve element is preferably a rotary valve part mounted to turn about an axis which extends essentially transversely of the passage through which the dry material flows, with this valve element desirably being circularly curved and being received within spaced arcuate slits in the valve body, and being apertured to in one rotary position pass a metered charge of the dry material downwardly past the location of the upper slit, and in a second rotary position pass the same charge of material downwardly past the location of the second slit. The handle means by which the tool is held and manipulated may include a handle part which is used both to support the tool and by rotary motion about an axis of the part to actuate the valve element. At its lower end, the tubular body has fingers which project downwardly below the bottom outlet to cultivate the earth's surface slightly as and after the dry material is dispensed.

BRIEF DESCRIPTION OF THE DRAWINGS

The above and other features and objects of the invention will be better understood from the following detailed description of the typical embodiment illustrated in the accompanying drawing in which:

FIG. 1 is a side view of an applicator constructed in accordance with the invention;

FIG. 2 is an enlarged fragmentary vertical section taken on line 2—2 of FIG. 1;

FIG. 3 is an enlarged fragmentary vertical section taken on line 3—3 of FIG. 2;

FIG. 4 is a bottom view of the lower end of the device taken on line 4—4 of FIG. 2;

FIG. 5 is a transverse section taken on line 5—5 of FIG. 2;

FIG. 6 is a horizontal section taken on line 6—6 of FIG. 2; and

FIG. 7 is a view similar to a portion of FIG. 2, but showing the handle in position for use by left handed persons.

DESCRIPTION OF THE PREFERRED EMBODIMENT

The applicator 10 illustrated in FIG. 1 includes an elongated essentially tubular body structure 11 removably carrying a bottle or other container 12 at its upper end for holding a quantity of dry granular or powder form fertilizer, insecticide, or combined fertilizer and insecticide. The body structure may be formed as a main upper body part 13 and a lower downwardly projecting tube 14 carrying a discharge foot part 15. A rotary valve element 16 controls the delivery of metered charges of the dry material downwardly through the device.

The three body parts, 13, 14 and 15 may all be formed to the illustrated shapes from any appropriate substantially rigid material, such as an appropriate rigid resinous plastic substance. Referring particularly to FIGS. 2 and 3, upper body part 13 contains an essentially vertical passage 17 which communicates at its upper end with the interior of bottle 12, and which communicates at its lower end with the passage 18 extending through the straight cylindrical tube 14. The upper end of body part 13 is shaped to form a socket recess 19 adapted to closely receive and form a seal with the lower neck 21 of the inverted bottle 12, and having internal threads 20 engageable with external threads 44 of neck 21 of the bottle to removably secure the bottle on body 13 in inverted condition. In extending downwardly from its upper annular portion 22 containing recess 19, body 13 has an essentially annular sidewall 23 extending about and forming passage 17 and having a first downwardly flaring portion 24, merging with a straight cylindrical portion 25, and then with a downwardly tapering portion 26, with a strengthening projection 27 extending laterally to the right in FIG. 2 along the entire vertical extent of the portions 24, 25 and 26 and having a vertical right surface 28 as seen in FIG. 6.

The valve element 16 is preferably of essentially cup shape, being circularly symmetrical about and adapted to turn about a horizontal axis 29. A circular disc portion 30 of valve element 16 extends transversely of axis 29 and lies in a vertical plane in the illustrated position of use of the tool, and carries a skirt portion 31 of the valve element which is cylindrical about axis 29 and turns about that axis with disc portion 30. At locations above and beneath axis 29, the cylindrical portion 31 of the valve element projects into an upper arcuately curving slit 32 formed in portion 24 of body 13, and a lower oppositely arcuately curving slit 33 formed in portion 26 of body 13. These slits extend parallel to axis 29, and have the same cylindrical curvature as the cylindrical wall portion 31 of valve 16. The slits are very narrow radially of axis 29, so that the thin wall 31 of the valve is a very close fit within the two slits 32 and 33, to prevent leakage of any substantial amount of the dry granular material from the interior of body 13 at the location of the slits, while at the same time leaving the wall 31 sufficiently loose in slits 32 and 33 to allow rotation of the valve element 16 relative to part 13 and about axis 29. The cylindrical valve wall 31 contains an upper circular charge port 34 and a lower discharge port 35, both of a diameter corresponding to the diameter of passage 17 at the locations of slits 32 and 33. In one rotary position of the valve element 16, port 34 is in line with passage 17 (FIG. 3 setting) and will pass dry granular insecticide and/or fertilizer downwardly from bottle 12 into the portion of passage 17 which is within the interior of cylindrical wall 31 of the valve element. When element 16 is turned in a counterclockwise direction from its FIG. 3 setting, port 34 first moves out of registry with passage 17, to an intermediate setting in which neither of the ports is in communication with the passage, and therefore all flow of granular material through the passage is blocked off, with further counterclockwise rotation of the valve element moving the lower discharge port 35 into alignment with passage 17 at the location of slit 33, to allow the metered charge of dry material within the portion of passage 17 in the interior of the valve element to flow downwardly through port 35 and the lower portion 36 of passage 17 into tube 14.

The valve is turned between its different positions by a handle part 37, which extends along and is centered about axis 29, to be grasped by a user in holding the tool as well as in turning the valve element. A bolt 38 may secure the handle to the valve element, and mount both of these parts rotatively to body 13, and for this purpose has an externally cylindrical portion 39 journaled rotatively within openings 40 in opposite side portions of body 13. A head 41 of bolt 38 and two locknuts 42 are received at opposite sides of the body, with washers 43 contacting the body, and with the nuts 42 being adjusted to allow sufficient looseness to permit rotation of the bolt relative to the body. The disc portion 30 of the valve part is clamped by a nut 49 and lockwasher 45 against the locknuts 42, to rigidly key the valve to the bolt for rotation therewith. Handle 37 has at its right end as viewed in FIG. 2 a hexagonal recess 50 within which the correspondingly externally hexagonal or otherwise noncircular nut 49 is a close fit to key the handle to the bolt for rotation therewith. The handle is retained on the bolt by an additional nut 46 at its left end as viewed in FIG. 2. The rotary motion of the handle and valve assembly relative to body 13 may be limited at the positions in which ports 34 and 35 respectively are in alignment with passage 17 by engagement of stop lugs 51 carried on the inner surface of skirt portion 31 of the valve element with the outer surface 52 of body 13.

It is preferred that the valve element 16 be formed of a suitable metal, having sufficient strength in the illustrated thin section to serve the intended valving function, and to remain rigid in operation.

Tube 14 may be standard resinous plastic tubing, and may have its upper end received and cemented or otherwise secured in a recess 53 formed in the lower portion of body 13. The part 15 at the lower end of tube 14 may have a similar cylindrical recess 54 within which the lower end of tube 14 is cemented or otherwise secured. At its underside, part 15 has a downwardly facing outlet opening 55, communicating through a short internal passage 56 with tube 14. The undersurface 57 of part 15 about opening 55 desirably extends horizontally when the tube 14 is inclined downwardly and forwardly as seen in FIG. 1, and when the main axis 58 of passage 17 in upper body 13 is disposed vertically. Along the forward edge of opening 55, part 15 forms a plurality of (preferably three) downwardly projecting cultivator fingers 59, which desirably extend directly vertically when surface 57 is horizontal and when the axis of tube 14 is inclined and axis 58 of the upper body is vertical as discussed. These fingers or teeth should preferably be blunt, and for that purpose may be defined by directly vertical and parallel opposite side surfaces 60 and horizontal undersurfaces 61 lying in a common plane spaced beneath the horizontal plane 62 of surface 57. The angle $a$ which inclined tube 14 makes with the vertical axis 58 is desirably between about 35° and 55°, preferably approximately 45°.

For assisting in holding and manipulating the device, body 13 has a rearwardly projecting handle portion 63, which may be externally cylindrical about an axis 64 disposed horizontally when axis 58 is vertical as discussed. This handle 63 is located at a level below the rotatable handle 37, and is offset 90° about axis 58 from the location of handle 37.

In using the device of FIGS. 1 to 6, a quantity of the dry granular fertilizer and/or insecticide is filled into bottle 12, and the bottle is connected to body 13 as shown. A user then grasps handle 63 with his right hand and handle 37 with his left hand and manipulates the tool until the lower portion 15 is adjacent the ground surface near the base of a plant. The inclination of tube 14 permits the tool to project into and through the foliage of the plant and to the desired location. While still holding the handles in the same manner, the operator turns handle part 37 about its longitudinal axis 29 to bring the charge port 34 into alignment with passage 17 and allow a predetermined amount of dry material to fall downwardly into and to fill the portion of passage 17 which is vertically between slits 32 and 33. After this chamber has been filled, the operator turns the handle 37 in the opposite direction while still holding the tool with his two hands, and thereby moves the valve element to a position in which passage 17 is first closed at the locations of both of the slits, and then only the lower port 35 is moved into alignment with passage 17 to discharge the metered charge of dry material from the measuring chamber. This arrangement assures accurate measurement of a certain amount of dry material on each operation, say for example one ounce, two ounces or any other appropriate quantity. The dry material thus measured and permitted to flow downwardly from the valve element falls through tube 14 and part 15 to discharge onto the ground surface from bottom outlet 55. This outlet is maintained above the earth's surface by engagement of fingers 59 with that surface. Because the valve is located at an upper elevation, the discharged material falls through a substantial vertical height in passing through tube 14, and distributes itself in a manner such that it discharges from bottom outlet 55 rather gradually, and can be spread as a ribbon or line along the earth's surface by moving the lower portion of the tool along the earth's surface as the measured material is dispensed. This same movement acts by engagement of fingers 59 with the surface to work the material into the earth a short distance, but because of the blunt condition of the teeth the tool cannot dig deeply into the surface and cannot damage the surface roots. If the quantity of dry material required for the particular plant is greater than one charge, the operation can be repeated a proper number of times, following which the tool can be moved to a next plant for treatment of it in the same manner. The rounded or forwardly convex configuration of the front surface of lower part 15 at the location of teeth 59 and above the teeth facilitates insertion of the tool through the foliage of a bush and avoids damages to the bush.

FIG. 7 shows a variational arrangement in which a threaded stud 38a has been substituted for bolt 38, to allow the handle 37a to project from the right side of body 13 as viewed in FIG. 2, rather than its left side, and to thus adapt the tool for use by a left-handed person. Stud 38a has an externally cylindrical portion 39a journaled within body 13, with two locked nuts 68 and a washer 65 being received at the right side of the body, and a nut 66 and washer 67 being received at the left side. A cap nut 69 and lock washer 70 clamp disc portion 30a of the valve (identical with valve 16 of the first form) against nut 66. These various parts are of course adjusted as in the first form of the invention to allow sufficient looseness between washers 65 and 67 to allow rotation of the stud relative to the body. Handle 37a has its hexagonal recess 50a engaging one of the lock nuts 68 to key it rotatively to the stud, while a cap nut 71 retains the handle at its outer end. A person using this arrangement of FIG. 7 grasps handle 63 with his left hand, and handle 37a with his right hand, to hold and manipulate the tool, and with rotation of handle 37a by the right hand acting to turn the valve 30a to first measure and then discharge a metered amount of the dry material as discussed.

While certain specific embodiments of the present invention have been disclosed as typical, the invention is of course not limited to these particular forms, but rather is applicable broadly to all such variations as fall within the scope of the appended claims.

I claim:

1. A fertilizer and/or insecticide applicator comprising:
    an elongated portable essentially tubular body structure adapted to carry at an upper location a supply of dry fertilizer and/or insecticide material, and containing a passage through which said material may fall downwardly to a bottom outlet opening for discharge through said opening onto a ground surface;
    handle means carried by the body structure and by which a user may hold and manipulate the applicator; and
    a valve element mounted to said body structure for rotary movement about an axis extending generally transversely of said passage and operable by said rotary movement to pass metered charges through said passage and to said outlet;
    said valve element having portions which are curved circularly about said axis and are received within curved spaced slits in said body structure, said valve element containing aperture means operable in one position to pass a metered charge of said material through the valve element at the location of an upper one of said slits, and operable in a second rotary position to pass the metered charge downwardly past the location of a lower one of said slits.

2. An applicator as recited in claim 1, in which said valve element is spaced substantially above said bottom outlet and at approximately the location of said handle means.

3. An applicator as recited in claim 1, in which said handle means include a handle part to be utilized for holding and manipulating the body structure and which is connected to said valve element for actuating it relative to the body structure.

4. A fertilizer and/or insecticide applicator comprising:
    an elongated portable essentially tubular body structure adapted to carry at an upper location a supply of dry fertilizer and/or insecticide material, and containing a passage through which said material may fall downwardly to a bottom outlet opening for discharge through said opening onto a ground surface;
    handle means carried by the body structure and by which a user may hold and manipulate the applicator; and
    a valve element mounted to said body structure for rotary movement about an axis extending generally transversely of said passage and operable by said rotary movement to pass metered charges through said passage and to said outlet;
    said handle means including an elongated handle grip part extending essentially along said axis and adapted to be grasped by a user and which is used to support said body structure and is also operable by rotary movement about said axis relative to the body structure to actuate said valve element.

5. A fertilizer and/or insecticide applicator comprising:
    an elongated portable essentially tubular body structure adapted to carry at an upper location a supply of dry fertilizer and/or insecticide material, and containing a passage through which said material may fall downwardly to a bottom outlet opening for discharge through said opening onto a ground surface;
    handle means carried by the body structure and by which a user may hold and manipulate the applicator; and
    a valve element mounted to said body structure for rotary movement about an axis extending generally transversely of said passage and operable by said rotary movement to pass metered charges through said passage and to said outlet;

said valve element having an essentially cylindrical wall centered about said axis and received and movable rotatively within two arcuately curved slits formed in said body structure at spaced upper and lower locations;

said cylindrical wall of the valve element containing aperture means acting in one rotary position of the valve element to pass a metered charge of said dry material downwardly past the location of said upper slit while blocking off downward movement of the material at said lower slit, and operable in a second rotary position to pass said metered charge of dry material downwardly past the location of said lower slit while blocking off flow of the material at said upper slit.

6. An applicator as recited in claim 5, in which said valve element acts in an intermediate rotary setting to block off downward flow of said dry material at the locations of both of said slits.

7. An applicator as recited in claim 6, in which said handle means include a handle grip part extending essentially along said axis and adapted to be used for holding and manipulating the body structure, and connected to said rotary valve element to turn it about said axis relative to the body structure.

8. An applicator as recited in claim 7, in which said handle means include a second handle part projecting rearwardly from said body structure at a location below the level of said first body part and in a direction different than that in which said body part projects.

9. A fertilizer and/or insecticide applicator comprising:

an elongated portable essentially tubular body structure adapted to carry at an upper location a supply of dry fertilizer and/or insecticide material, and containing a passage through which said material may fall downwardly to a bottom outlet opening for discharge through said opening onto a ground surface;

handle means carried by the body structure and by which a user may hold and manipulate the applicator; and a valve element mounted to said body structure for rotary movement about an axis extending generally transversely of said passage and operable by said rotary movement to pass metered charges through said passage and to said outlet;

said body structure having an upper portion which extends generally vertically in use, and a lower portion extending downwardly and forwardly at an inclination to said outlet;

said valve element having a portion extending essentially transversely of said axis at the outside of said body structure and carrying an essentially cylindrical second portion of the valve element;

said cylindrical portion being received in two spaced upper and lower arcuate slots extending into said vertical portion of the body structure from a side thereof;

said cylindrical portion of the valve element containing a first aperture which in one rotary setting of the valve element passes the dry material downwardly past the location of said upper slit while movement of the dry material past the location of the lower slit is prevented, and containing a second aperture which in a second rotary position of the valve element passes a metered charge of the dry material downwardly past the location of said second slit while downflow past the location of the first slit is prevented;

said rotary valve element having an intermediate setting in which said cylindrical portion blocks the flow of said material at the locations of both of said slits;

said handle means including a first handle part shaped as a handle grip extending along said axis and connected to said valve element to rotate it relative to the body structure, and a second handle part projecting rearwardly from said vertical portion of the body structure;

said bottom outlet being formed at the lower end of said lower portion of the body structure and extending generally horizontally when said lower portion of the body structure is inclined;

there being a plurality of fingers projecting downwardly from the bottom of said lower portion of the body structure and below the level of said outlet for cultivating the earth'surface.

10. A fertilizer and/or insecticide applicator comprising:

an elongated portable essentially tubular body structure adapted to carry at an upper location a supply of dry fertilizer and/or insecticide material and containing a passage through which said material may fall downwardly to a bottom outlet opening for discharge through said opening onto a ground surface;

handle means carried by the body structure and by which a user may hold and manipulate the applicator;

a valve element adapted to pass metered charges of said dry material downwardly through said body structure to said outlet; and a plurality of fingers at the bottom of said body structure projecting downwardly beneath the level of said bottom outlet to cultivate the earth's surface without interfering with the discharge of the material from the outlet;

said body structure having a lower portion which is inclined downwardly and forwardly in use;

said outlet facing downwardly and being disposed in a generally horizontal plane when said lower portion of the body structure is inclined; and said fingers projecting downwardly at a forward edge of said bottom outlet opening and being disposed approximately vertically when said opening is horizontal and said lower portion of the body structure is inclined.

11. An applicator as recited in claim 10, in which said fingers are blunt.

12. A fertilizer and/or insecticide applicator comprising:

an elongated portable essentially tubular body structure adapted to carry at an upper location a supply of dry fertilizer and/or insecticide material and containing a passage through which said material may fall downwardly to a bottom outlet opening for discharge through said opening onto a ground surface;

handle means carried by the body structure and by which a user may hold and manipulate the applicator;

a valve element adapted to pass metered charges of said dry material downwardly through said body structure to said outlet; and a plurality of fingers at the bottom of said body structure projecting downwardly beneath the level of said bottom outlet to cultivate the earth's surface without interfering with the discharge of the material from the outlet;

said body structure having a forwardly facing surface at the upper ends of said fingers which, as viewed in horizontal section, is of forwardly convex rounded configuration.

13. An applicator as recited in claim 12, in which said bottom outlet faces downwardly in use.

14. An applicator as recited in claim 12, in which said bottom outlet opens downwardly and lies in an essentially horizontal plane, and said fingers project downwardly beneath said plane.

15. An applicator as recited in claim 12, in which said plurality of fingers as viewed in horizontal section are arranged in an essentially curving pattern following essentially the curvature, in a horizontal plane, of said forwardly convex surface.

16. A fertilizer and/or insecticide applicator comprising:

an elongated portable essentially tubular body structure adapted to carry at an upper location a supply of dry fertilizer and/or insecticide material, and containing a passage through which said material may fall downwardly to a bottom outlet opening for discharge through said opening onto a ground surface;

handle means carried by the body structure and by which a user may hold and manipulate the applicator; and a valve movably mounted to said body structure and operable to pass metered charges through said passage and to said outlet;

said tubular body structure having an upper portion which extends essentially vertically when the applicator is in use and which movably carries said valve element, and a lower portion which extends at an oblique angle to said essentially vertical upper portion and at an inclination forwardly and downwardly from said essentially vertical upper portion to said bottom outlet in a relation positioning said bottom outlet a substantial distance forwardly of said upper portion of the body structure when said upper portion is vertical.

17. An applicator as recited in claim 16, in which said body structure has a plurality of fingers near said bottom outlet which project essentially directly vertically downwardly when said lower portion of the body structure is inclined for cultivating the earth's surface as said material is discharged through said outlet.

18. An applicator as recited in claim 16, in which said lower portion of the body structure carries a plurality of cultivating fingers which project essentially directly vertically downwardly when said lower portion of the body structure is inclined, said fingers projecting downwardly lower than said bottom outlet, and said outlet being in a generally horizontal plane spaced above lower ends of said fingers when said lower portion of the body structure is inclined.

19. An applicator as recited in claim 16, including a container for holding a supply of said dry fertilizer and/or insecticide material and detachably mounted to said essentially vertical upper portion of the body structure.

20. A fertilizer and/or insecticide applicator comprising:

an elongated portable essentially tubular body structure adapted to carry at an upper location a supply of dry fertilizer and/or insecticide material and containing a passage through which said material may fall downwardly to a bottom outlet opening for discharge through said opening onto a ground surface;

handle means carried by the body structure and by which a user may hold and manipulate the applicator;

a valve element adapted to pass metered charges of said dry material downwardly through said body structure to said outlet; and a plurality of fingers at the bottom of said body structure projecting downwardly beneath the level of said bottom outlet to cultivate the earth's surface without interfering with the discharge of the material from the outlet;

said body structure having a lower portion which is inclined downwardly and forwardly in use;

said outlet facing downwardly and being disposed in a generally horizontal plane when said lower portion of the body structure is inclined;

said fingers projecting downwardly adjacent said bottom outlet opening and being disposed approximately vertically when said opening is horizontal and said lower portion of the body structure is inclined.

21. A fertilizer and/or insecticide applicator comprising:

an elongated portable essentially tubular body structure adapted to carry at an upper location a supply of dry fertilizer and/or insecticide material and containing a passage through which said material may fall downwardly to a bottom outlet opening for discharging through said opening onto a ground surface;

handle means carried by the body structure and by which a user may hold and manipulate the applicator;

a valve element adapted to pass metered charges of said dry material downwardly through said body structure to said outlet; and a plurality of fingers at the bottom of said body structure projecting downwardly beneath the level of said bottom outlet to cultivate the earth's surface without interfering with the discharge of the material from the outlet;

said fingers, as viewed in horizontal section, being arranged in a forwardly convex essentially curving pattern.

* * * * *